US009484987B2

(12) United States Patent
Nishi

(10) Patent No.: US 9,484,987 B2
(45) Date of Patent: Nov. 1, 2016

(54) INFORMATION PROCESSING APPARATUS, SYSTEM, AND INFORMATION PROCESSING METHOD

(71) Applicant: FUJI XEROX CO., LTD., Tokyo (JP)

(72) Inventor: Eiji Nishi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/611,432

(22) Filed: Feb. 2, 2015

(65) Prior Publication Data

US 2016/0006483 A1    Jan. 7, 2016

(30) Foreign Application Priority Data

Jul. 4, 2014  (JP) ................................. 2014-138904

(51) Int. Cl.
*H04B 5/00* (2006.01)
*H04W 76/02* (2009.01)
*H04W 84/18* (2009.01)
*H04W 88/06* (2009.01)

(52) U.S. Cl.
CPC ......... *H04B 5/0031* (2013.01); *H04W 76/023* (2013.01); *H04W 84/18* (2013.01); *H04W 88/06* (2013.01)

(58) Field of Classification Search
CPC . H04B 5/0031; H04W 76/023; H04W 84/12
USPC ...................................................... 455/41.1
See application file for complete search history.

(56) References Cited

U.S. PATENT DOCUMENTS

| 2004/0192221 A1* | 9/2004 | Matsunaga | H04W 36/30 455/76 |
| 2013/0201525 A1* | 8/2013 | Niwa | G06F 3/1236 358/1.15 |
| 2013/0201981 A1* | 8/2013 | Niwa | H04W 76/043 370/338 |
| 2015/0029544 A1* | 1/2015 | Yun | G06F 3/1292 358/1.15 |
| 2015/0049359 A1* | 2/2015 | Lee | G06F 3/1292 358/1.15 |
| 2015/0049360 A1* | 2/2015 | Lee | G06F 3/1292 358/1.15 |

FOREIGN PATENT DOCUMENTS

| JP | 2002-094523 A | 3/2002 |
| JP | 2004-304399 A | 10/2004 |
| JP | 2010-211722 A | 9/2010 |

* cited by examiner

*Primary Examiner* — April G Gonzales
(74) *Attorney, Agent, or Firm* — Sughrue Mion, PLLC

(57) ABSTRACT

An information processing apparatus includes a first communication unit, a second communication unit, and a communication-apparatus-side controller. The first communication unit performs wireless communication with plural terminal apparatuses, the number of which is less than or equal to a predetermined maximum number of connections. The second communication unit performs wireless communication with a connection-requesting terminal apparatus that newly attempts to perform wireless communication with the first communication unit. The communication-apparatus-side controller switches the wireless communication via the second communication unit to wireless communication via the first communication unit, the wireless communication via the first communication unit being performed using a dedicated line prepared in advance.

12 Claims, 5 Drawing Sheets

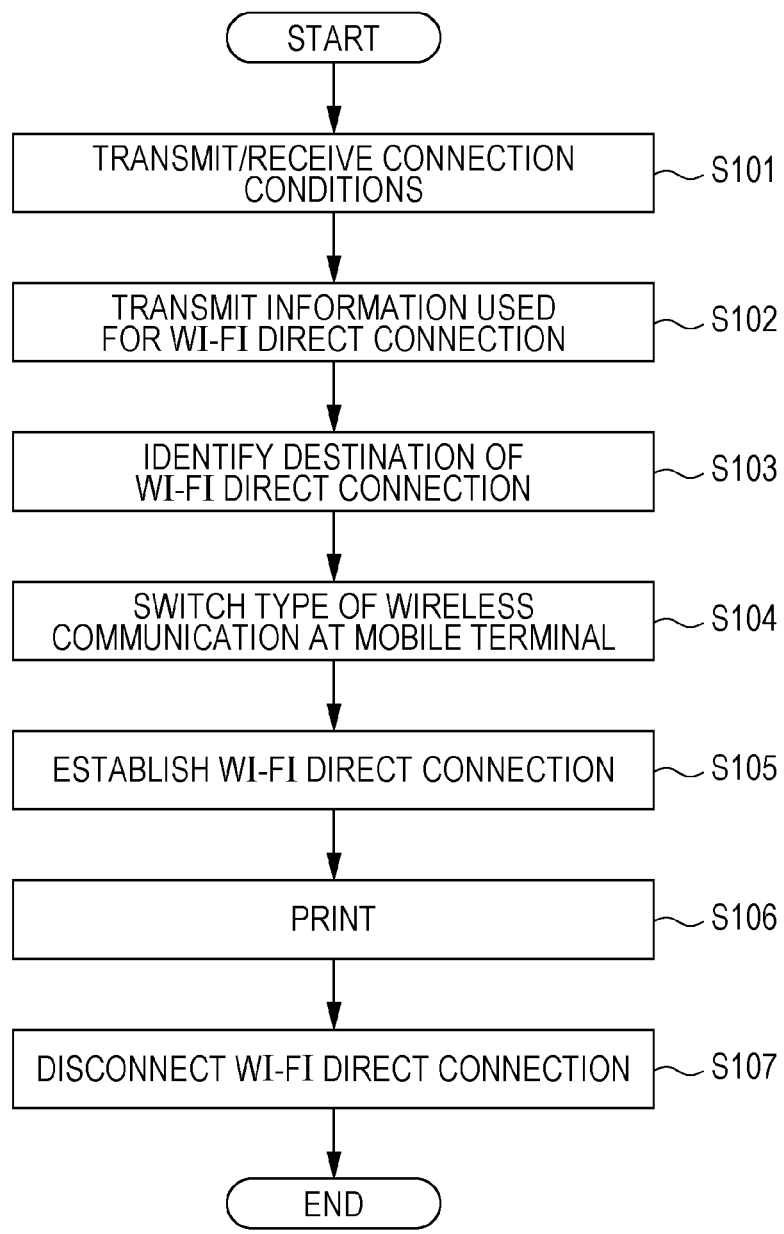

INFORMATION PROCESSING APPARATUS, SYSTEM, AND INFORMATION PROCESSING METHOD

CROSS-REFERENCE TO RELATED APPLICATIONS

This application is based on and claims priority under 35 USC 119 from Japanese Patent Application No. 2014-138904 filed Jul. 4, 2014.

BACKGROUND (i) Technical Field

The present invention relates to an information processing apparatus, a system, and an information processing method.

(ii) Related Art

For example, there are cases where a user wishes to connect a terminal apparatus to an information processing apparatus by using wireless communication based on Wireless Fidelity (Wi-Fi) or the like. In such cases, the terminal apparatus and the information processing apparatus may be automatically and easily connected to each other by causing the terminal apparatus to transmit and receive connection conditions via wireless communication such as near-field communication (NFC) in advance.

SUMMARY

According to an aspect of the invention, there is provided an information processing apparatus including a first communication unit, a second communication unit, and a communication-apparatus-side controller. The first communication unit performs wireless communication with plural terminal apparatuses, the number of which is less than or equal to a predetermined maximum number of connections. The second communication unit performs wireless communication with a connection-requesting terminal apparatus that newly attempts to perform wireless communication with the first communication unit. The communication-apparatus-side controller switches the wireless communication via the second communication unit to wireless communication via the first communication unit, the wireless communication via the first communication unit being performed using a dedicated line prepared in advance.

BRIEF DESCRIPTION OF THE DRAWINGS

An exemplary embodiment of the present invention will be described in detail based on the following figures, wherein:

FIG. 5 is a flowchart describing operations of the image processing apparatus and the mobile terminal.

DETAILED DESCRIPTION

An exemplary embodiment of the present invention will be described in detail below with reference to the accompanying drawings.

System Configuration

Figure 1:
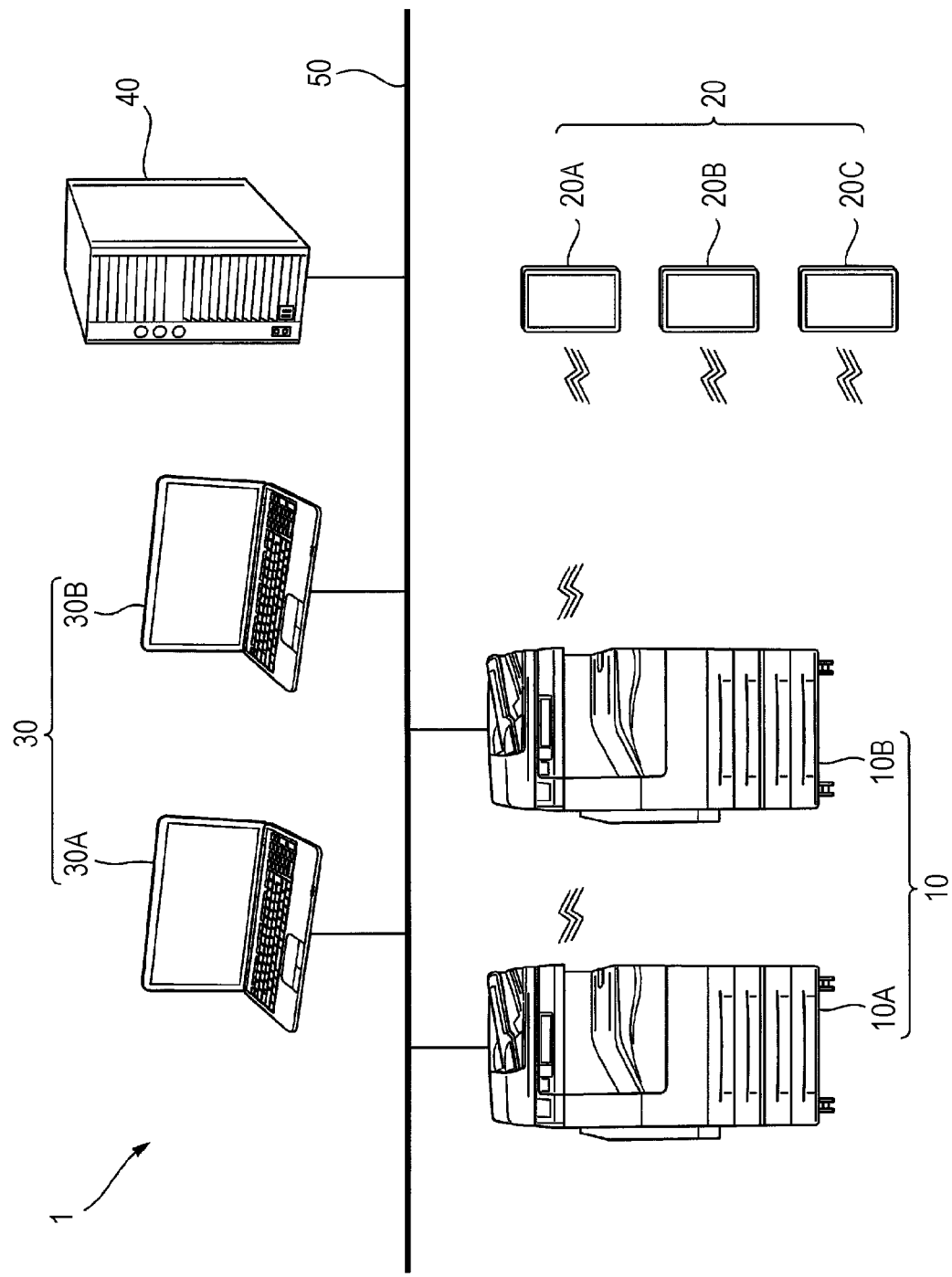
FIG. 1 illustrates an example of an overall configuration of an image processing system according to an exemplary embodiment.

An overall configuration of an image processing system 1 according to an exemplary embodiment will be described. FIG. 1 illustrates an example of an overall configuration of the image processing system 1 according to the present exemplary embodiment. As illustrated in FIG. 1, the image processing system 1 includes an image processing apparatus 10A, an image processing apparatus 10B, a mobile terminal 20A, a mobile terminal 20B, a mobile terminal 20C, an operation terminal 30A, an operation terminal 30B, and a management server 40. Wireless communication is performed among the image processing apparatus 10A, the image processing apparatus 10B, the mobile terminal 20A, the mobile terminal 20B, and the mobile terminal 20C. In addition, the image processing apparatus 10A, the image processing apparatus 10B, the operation terminal 30A, the operation terminal 30B, and the management server 40 are connected to a network 50 and perform communication with one another via the network 50.

The image processing apparatuses 10A and 10B are illustrated in FIG. 1; however, the image processing apparatuses 10A and 10B are referred to as image processing apparatuses 10 if distinction between them is not required. Likewise, the mobile terminals 20A, 20B, and 20C are illustrated in FIG. 1; however, the mobile terminals 20A, 20B, and 20C are referred to as mobile terminals 20 if distinction between them is not required. Further, the operation terminals 30A and 30B are illustrated in FIG. 1; however, the operation terminals 30A and 30B are referred to as operation terminals 30 if distinction between them is not required. Two image processing apparatuses 10 are provided in the example illustrated in FIG. 1; however, three or more image processing apparatuses 10 may be provided. Further, three mobile terminals 20 are provided in the example illustrated in FIG. 1; however, four or more mobile terminals 20 may be provided. In addition, two operation terminals 30 are provided in the example illustrated in FIG. 1; however, three or more operation terminals 30 may be provided.

Each of the image processing apparatuses 10 is, for example, an apparatus having functions such as a scan function, a print function, a copy function, and a facsimile function, and forms an image on a recording medium such as paper and outputs the resulting recording medium. Each of the image processing apparatuses 10 receives a print job from the mobile terminals 20 and the operation terminals 30 and executes a printing process in accordance with the print job that has been received. A print job includes image data to be printed and a control instruction that describes settings used in the printing process, and is data that serves as a unit of a printing process executed by the image processing apparatus 10.

Each of the mobile terminals 20 is a mobile computer apparatus used when an instruction to execute various functions is given to the image processing apparatuses 10. For example, a device such as a smartphone, a tablet personal computer (PC), or a notebook PC may be used as the mobile terminal 20.

Each of the operation terminals 30 is a computer apparatus used by a user to view and edit a document file. For example, a device such as a notebook PC or a desktop PC may be used as the operation terminal 30. In addition, a mobile computer apparatus such as a smartphone may also be used as the operation terminal 30.

The management server 40 is a computer apparatus that stores various kinds of data processed by the image processing system 1.

The network 50 is a communication medium used for communication of information among apparatuses such as the image processing apparatuses 10, the operation terminals 30, and the management server 40. The network 50 is, for example, a wired local area network (LAN).

In the present exemplary embodiment, short-range wireless communication (e.g., NFC) and wireless communication based on another communication standard (e.g., Wi-Fi Direct (registered trademark)) that achieves a speed higher than that achieved with the short-range wireless communication are performed between the image processing apparatuses 10 and the mobile terminals 20. NFC is a wireless communication standard in which a communication range is limited to approximately ten centimeters. In addition, Wi-Fi Direct is a standard that enables direct communication between Wi-Fi (registered trademark) terminals. According to Wi-Fi Direct, each Wi-Fi device has a function for operating as an access point. An access point is a relay device that wirelessly relays communication between devices. Specifically, according to Wi-Fi Direct, one of plural Wi-Fi devices that participate in a network substantially operates as an access point, and direct communication is performed between the device serving as the access point and the other Wi-Fi devices.

According to Wi-Fi Direct, each communication apparatus that participates in a certain network is defined as a peer-to-peer (P2P) device, and the network is defined as a P2P group. A P2P device that substantially operates as an access point in a P2P group is defined as a P2P group owner. P2P devices other than the P2P group owner are defined as P2P clients. Each P2P device exchanges a signal with another P2P device to detect a P2P device that serves as a candidate of the Wi-Fi Direct connection destination. In this way, the P2P group owner is selected from among plural P2P devices.

In the present exemplary embodiment, a description will be given on the assumption that the image processing apparatuses 10 serve as the P2P group owners. In addition, according to Wi-Fi Direct, a maximum number of P2P clients that are allowed to connect to the P2P group owner at one time is generally set. In the present exemplary embodiment, it is assumed that the maximum number of mobile terminals 20 that are allowed to connect to each of the image processing apparatuses 10 using Wi-Fi Direct at one time (hereinafter, referred to as the number of simultaneous connections) is three.

Hardware Configuration of Image Processing Apparatus 10

Figure 2:
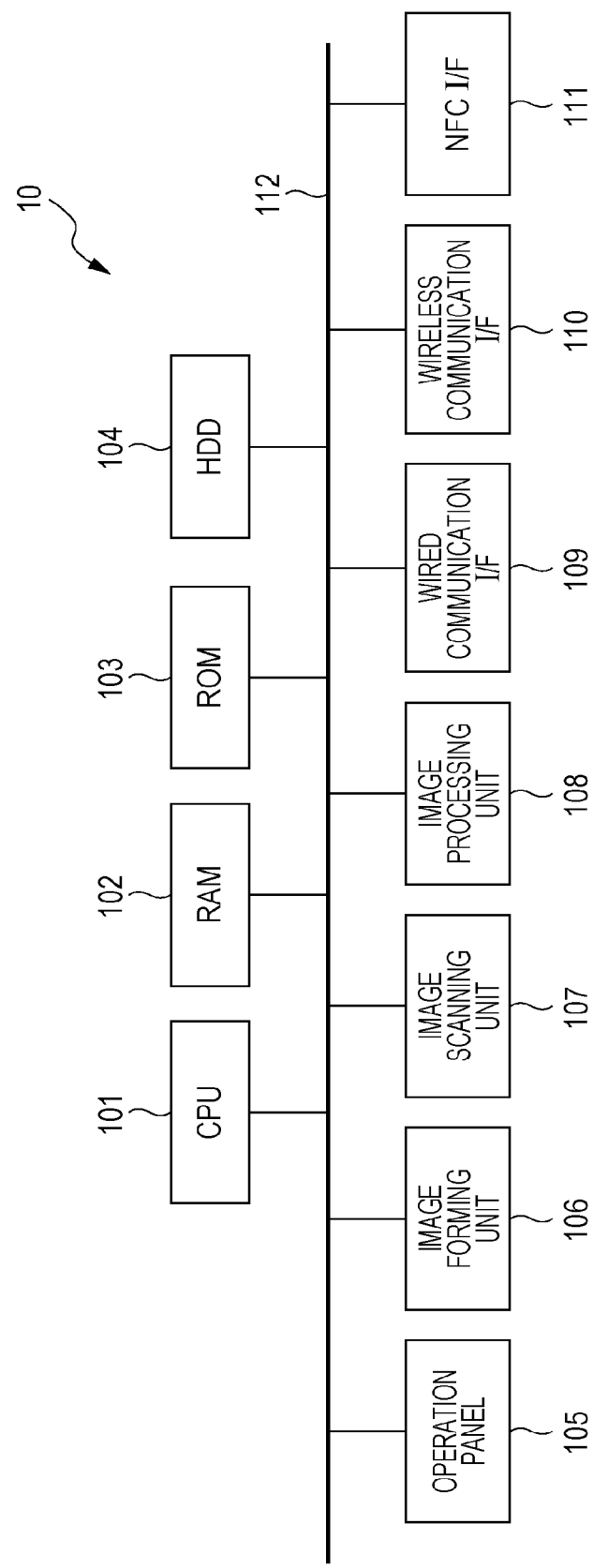
FIG. 2 illustrates an example of a hardware configuration of an image processing apparatus.

A hardware configuration of the image processing apparatus 10 will be described next. FIG. 2 illustrates an example of a hardware configuration of the image processing apparatus 10. As illustrated in FIG. 2, the image processing apparatus 10 includes a central processing unit (CPU) 101, a random access memory (RAM) 102, a read only memory (ROM) 103, a hard disk drive (HDD) 104, an operation panel 105, an image forming unit 106, an image scanning unit 107, an image processing unit 108, a wired communication interface (I/F) 109, a wireless communication I/F 110, and an NFC I/F 111, which are connected to a bus 112 and exchange data with one another via the bus 112.

The CPU 101 executes various kinds of software such as an operating system (OS) and applications. The RAM 102 is a memory that is used as, for example, a work memory of the CPU 101. The ROM 103 is a memory that stores, for example, various programs to be executed by the CPU 101. The CPU 101 loads the various programs stored in the ROM 103 or the like into the RAM 102 and executes the various programs so as to implement the functions of the image processing apparatus 10.

The HDD 104 is, for example, a magnetic disk device that stores image data or the like used in an image forming operation performed by the image forming unit 106.

The programs to be executed by the CPU 101 may be pre-stored in the ROM 103 or may be provided after being stored on a computer readable recording medium, such as a magnetic recording medium (such as a magnetic tape or a magnetic disk), an optical recording medium (such as an optical disc), a magneto-optical recording medium, or a semiconductor memory. Alternatively, the programs may be provided to the CPU 101 via the network 50, for example.

The operation panel 105 is a touch panel that displays various kinds of information and accepts an operation input from a user. The operation panel 105 includes a display that displays various kinds of information and a position detector sheet that detects a position touched with a finger or a stylus. Any detector, such as a detector that detects a touched position based on a pressure caused by the touch or based on a static electricity of an object that has touched, may be used to detect the touched position. In addition, a display and an input device such as a keyboard may be used in place of the touch panel.

The image forming unit 106 forms an image on a recording medium. For example, a printer such as an electrophotographic printer that transfers toner on a photoconductor onto a recording medium so as to form an image on the recording medium or an inkjet printer that ejects ink onto a recording medium so as to form an image on the recording medium may be used as the image forming unit 106.

The image scanning unit 107 scans an image on a recording medium and generates image data representing the image that has been scanned. The image scanning unit 107 is, for example, a scanner such as of a charge coupled device (CCD) system in which reflecting light of light that has been sequentially radiated onto an original from a light source is size-reduced by a lens and is received by CCDs or of a contact image sensor (CIS) system in which reflecting light of light that has been radiated onto an original from a light-emitting diode (LED) light source is received by a CIS.

The image processing unit 108 performs image processing such as color correction and gradation correction on image data input thereto and generates image data that has undergone the image processing.

The wired communication I/F 109 functions as a communication interface that enables transmission and reception of various kinds of data to and from the operation terminals 30 and the management server 40 via the network 50.

The wireless communication I/F 110 includes an antenna used to perform, for example, W-Fi Direct wireless communication with the mobile terminals 20 and functions as a communication interface that enables transmission and reception of various kinds of data to and from the mobile terminals 20.

The NFC I/F 111 includes an antenna used to perform NFC communication with the mobile terminals 20 and functions as a communication interface that enables transmission and reception of various kinds of data to and from the mobile terminals 20.

Hardware Configuration of Mobile Terminal 20

Figure 3:
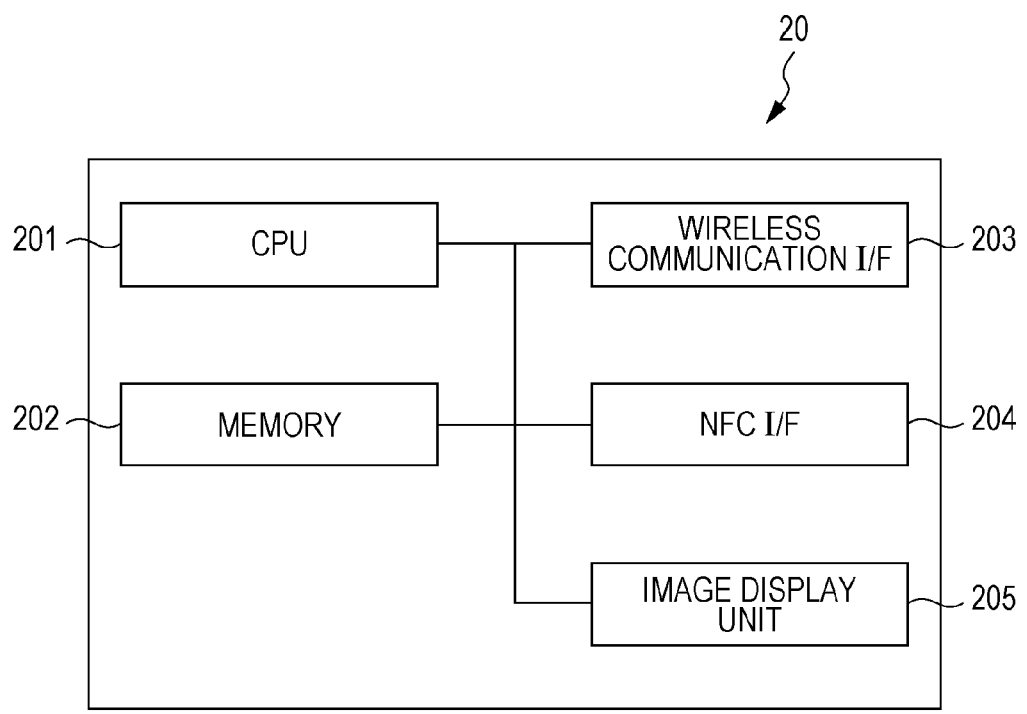
FIG. 3 illustrates an example of a hardware configuration of a mobile terminal.

FIG. 3 illustrates a hardware configuration of the mobile terminal 20.

As illustrated in FIG. 3, the mobile terminal 20 includes a CPU 201 and a memory 202. The CPU 201 executes various kinds of software such as an OS and applications.

The memory 202 includes a storage area in which the various kinds of software, data used for execution of the various kinds of software, and so on are stored.

Programs to be executed by the CPU 201 may be pre-stored in the memory 202 or may be provided to the CPU 201 after being stored on a computer readable recording medium, such as a magnetic recording medium (such as a magnetic tape or a magnetic disk), an optical recording medium (such as an optical disc), a magneto-optical recording medium, or a semiconductor memory. Alternatively, the programs may be provided to the CPU 201 via the Internet, for example.

The mobile terminal 20 further includes a wireless communication I/F 203 and an NFC I/F 204 that enable wireless communication with an external device, and an image display unit 205 that displays an image.

The wireless communication I/F 203 has a configuration and a function that are similar to those of the wireless communication I/F 110 (see FIG. 2) of the image processing apparatus 10. In addition, the NFC I/F 204 has a configuration and a function that are similar to those of the NFC I/F 111 (see FIG. 2) of the image processing apparatus 10.

The image display unit 205 is, for example, a touch panel. Accordingly, the image display unit 205 includes a liquid crystal panel and a position detector (not illustrated) that detects a position of the liquid crystal panel that is touched by an object such as a human finger or a stylus when the liquid crystal panel is touched by the object. The touch panel used in the present exemplary embodiment is not limited to any particular type, and a touch panel of any given type such as a resistive film type or an electrostatic capacitive type may be used.

The mobile terminal 20 may include, for example, an HDD or a flash memory as a memory. An HDD or a flash memory stores data to be input to various kinds of software and data output from the various kinds of software, for example. The mobile terminal 20 may further include an input device, such as a keyboard or a mouse.

In the above-described image processing system 1, the mobile terminals 20 and the operation terminals 30 transmit a print job to the image processing apparatuses 10 via the network 50 or Wi-Fi Direct wireless communication. In this way, printing is performed by the image processing apparatuses 10.

The management server 40 is capable of managing print jobs to be executed by the image processing apparatuses 10, rearranging the print jobs in an appropriate order, and transmitting the print jobs to the image processing apparatus 10. In this case, the management server 40 functions as a print server. The management server 40 is capable of managing files so as to allow the files to be shared among the mobile terminals 20 and the operation terminals 30. In this case, the management server 40 functions as a file server.

In the present exemplary embodiment, there are two methods for newly connecting the mobile terminal (terminal apparatus) 20 to the image processing apparatus 10 by using Wi-Fi Direct.

One method is a method in which the mobile terminal 20 is operated to directly connect the mobile terminal 20 to the image processing apparatus 10. According to this method, a user causes the mobile terminal 20 to display access points currently available for connection on the image display unit 205, for example. Then, the user selects a service set identifier (SSID) corresponding to the image processing apparatus 10 from among the displayed access points and inputs a password or the like. In this way, a connection is established. Note that the password is not requested in some cases.

The other method is a method that uses the NFC I/F 111. According to this method, a user of the mobile terminal 20 pre-sets connection conditions in order to connect the mobile terminal 20 to the image processing apparatus 10 by using Wi-Fi Direct. The NFC I/F 204 of the mobile terminal 20 performs wireless communication with the NFC I/F 111 of the image processing apparatus 10 so as to transmit the connection conditions to the image processing apparatus 10. This consequently causes the image processing apparatus 10 to perform authentication of the mobile terminal 20. In this way, the mobile terminal 20 is connected to the image processing apparatus 10 by using Wi-Fi Direct.

According to this method, the mobile terminal 20 and the image processing apparatus 10 first use NFC to perform wireless communication, via which the connection conditions are transmitted and received by the NFC I/F 204 and the NFC I/F 111. After the mobile terminal 20 has been authenticated, the communication mode is switched from NFC to Wi-Fi Direct (handover).

Thereafter, the mobile terminal 20 and the image processing apparatus 10 perform wireless communication by using Wi-Fi Direct via the wireless communication I/F 203 and the wireless communication I/F 110, respectively. Specifically, the image processing apparatus 10 performs wireless communication via the wireless communication I/F 110 instead of the NFC I/F 111 as a result of handover. The mobile terminal 20 performs wireless communication via the wireless communication I/F 203 instead of the NFC I/F 204 as a result of handover. That is, this method (NFC connection handover technology) causes the mobile terminal 20 and the image processing apparatus 10 to be connected to each other by using Wi-Fi Direct in response to the mobile terminal 20 being placed over or on the NFC I/F 111 of the image processing apparatus 10. This method thus reduces a load imposed on a user at the time of connection and improves user friendliness.

However, as described above, the maximum number of mobile terminals 20 that are allowed to connect to the image processing apparatus 10 is set when Wi-Fi Direct is used. In the above-described example, the maximum number is set to three. For this reason, if the number of mobile terminals 20 that are already connected to the image processing apparatus 10 has reached the maximum number of connections allowed in Wi-Fi Direct when the mobile terminal 20 is newly connected to the image processing apparatus 10, the new connection is not allowed.

When the mobile terminal 20 is newly connected to the image processing apparatus 10 by using the NFC I/F 111, a user of the mobile terminal 20 is in front of the image processing apparatus 10. That is, it is highly likely that the user wishes to use the image processing apparatus 10 immediately and urgently. Thus, the user is desirably prioritized and allowed to use the image processing apparatus 10. In the related art, however, the user is not allowed to use the image processing apparatus 10 until a connection of another mobile terminal 20 to the image processing apparatus 10 is terminated and a Wi-Fi Direct communication line becomes available.

Accordingly, in the present exemplary embodiment, the image processing apparatus 10 and the mobile terminal 20 are configured to have the following functional configurations so as to preferentially allow a user to establish a connection when the user newly attempts, by using the NFC I/F 111, to connect the mobile terminal 20 to the image processing apparatus 10.

Description regarding Functional Configurations of Image Processing Apparatus 10 and Mobile Terminal 20

Figure 4:
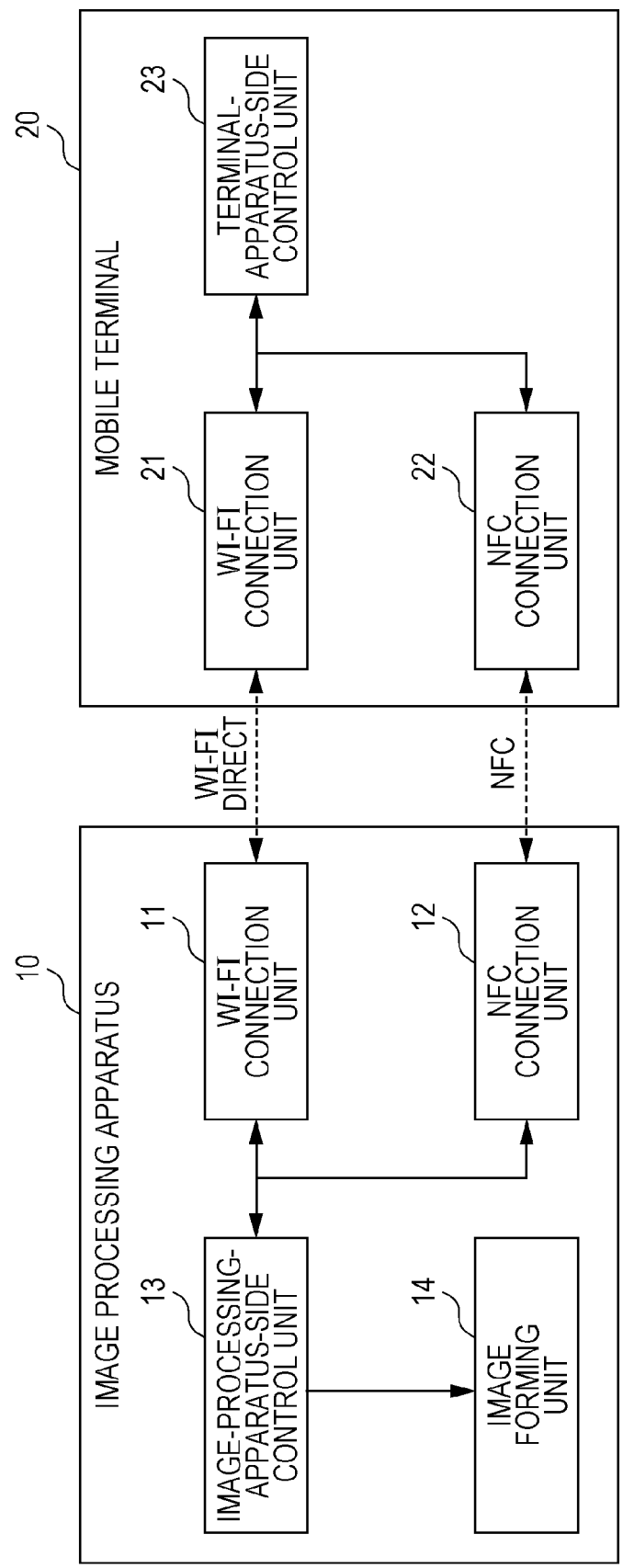
FIG. 4 is a block diagram illustrating an example of functional configurations of the image processing apparatus and the mobile terminal.

FIG. 4 is a block diagram illustrating an example of functional configurations of the image processing apparatus 10 and the mobile terminal 20.

As illustrated in FIG. 4, the image processing apparatus 10 includes a Wi-Fi connection unit 11, an NFC connection unit 12, an image-processing-apparatus-side control unit 13, and an image forming unit 14. The mobile terminal 20 includes a Wi-Fi connection unit 21, an NFC connection unit 22, and a terminal-apparatus-side control unit 23. Note that FIG. 4 selectively illustrates functions related to the present exemplary embodiment from among various functions of the image processing apparatus 10 and the mobile terminal 20. In addition, as illustrated in FIG. 4, the image processing apparatus 10 may be considered as an information processing apparatus in the present exemplary embodiment.

The Wi-Fi connection unit 11, which is an example of a first communication unit, is a functional unit that performs Wi-Fi Direct wireless communication in the image processing apparatus 10. The Wi-Fi connection unit 11 corresponds to the wireless communication I/F 110 illustrated in FIG. 2. Specifically, the Wi-Fi connection unit 11 has a function that enables transmission and reception of information via wireless communication to and from plural mobile terminals 20, the number of which is less than or equal to a predetermined maximum number of connections.

The NFC connection unit 12, which is an example of a second communication unit, is a functional unit that performs NFC wireless communication in the image processing apparatus 10. The NFC connection unit 12 corresponds to the NFC I/F 111 illustrated in FIG. 2. Specifically, the NFC connection unit 12 has a function that enables transmission and reception of information concerning connection conditions via wireless communication to and from the mobile terminal 20 (which is also referred to as a connection-requesting terminal apparatus) that attempts to perform wireless communication with the Wi-Fi connection unit 11. The information concerning connection conditions is used to establish a connection to the Wi-Fi connection unit 11 using the pre-set connection conditions. The information concerning connection conditions transmitted from the mobile terminal 20 includes, for example, a media access control (MAC) address or a serial number of the mobile terminal 20. In addition, the information concerning connection conditions transmitted from the image processing apparatus 10 includes, for example, a MAC address or an SSID of the image processing apparatus 10.

The image-processing-apparatus-side control unit 13, which is an example of a communication-apparatus-side controller, controls the Wi-Fi connection unit 11, the NFC connection unit 12, and the image forming unit 14. The image-processing-apparatus-side control unit 13 corresponds to a combination of the CPU 101, the RAM 102, the ROM 103, the HDD 104, and the image processing unit 108 illustrated in FIG. 2.

The image forming unit 14 is a functional unit that forms an image. The image forming unit 14 corresponds to the image forming unit 106 illustrated in FIG. 2. In the present exemplary embodiment, image information used by the image forming unit 14 to form an image is received not by the NFC connection unit 12 but by the Wi-Fi connection unit 11. That is, information transmitted or received by the Wi-Fi connection unit 11 via wireless communication includes the image information used by the image forming unit 14 to form an image. This is because Wi-Fi Direct generally has a higher communication speed than NFC and image information, which is likely to contain a large amount of data, is transmitted at a higher rate when Wi-Fi Direct is used than when NFC is used.

The Wi-Fi connection unit 21 is a functional unit that performs Wi-Fi Direct communication in the mobile terminal 20. The Wi-Fi connection unit 21 corresponds to the wireless communication I/F 203 illustrated in FIG. 3. Specifically, the Wi-Fi connection unit 21 has a function that enables transmission and reception of information to and from the image processing apparatus 10 via a wireless communication network (a Wi-Fi Direct communication network in this case) for which a maximum number of connections is predetermined.

The NFC connection unit 22 is a functional unit that performs NFC communication in the mobile terminal 20. The NFC connection unit 22 corresponds to the NFC I/F 204 illustrated in FIG. 3. Specifically, the NFC connection unit 22 has a function that enables transmission and reception of information concerning connection conditions via wireless communication in order to establish a connection between the Wi-Fi connection unit 21 and the image processing apparatus 10 by using the pre-set connection conditions.

The terminal-apparatus-side control unit 23 controls the Wi-Fi connection unit 21 and the NFC connection unit 22. According to the aforementioned NFC connection handover technology, the terminal-apparatus-side control unit 23 has a function for switching wireless communication from wireless communication via the NFC connection unit 22 to wireless communication via the Wi-Fi connection unit 21. The terminal-apparatus-side control unit 23 corresponds to a combination of the CPU 201 and the memory 202 illustrated in

FIG. 3.

Description Regarding Image-Processing-Apparatus-Side Control Unit 13

The image-processing-apparatus-side control unit 13 will be described in more detail.

The image-processing-apparatus-side control unit 13 provides (assigns) as many dedicated lines as the number of connections predetermined for the mobile terminals 20 (i.e., the connection-requesting terminal apparatuses) that attempt, by using the NFC connection unit 12, to perform wireless communication with the Wi-Fi connection unit 11 and preferentially allows the mobile terminals 20 to use the Wi-Fi connection unit 11. Wi-Fi Direct wireless communication is performed by using the dedicated line. That is, this dedicated line is a line exclusively assigned to this connection-requesting terminal apparatus and is a line which is not made available to the mobile terminal 20 that attempts, without using the NFC connection unit 12, to perform wireless communication with the Wi-Fi connection unit 11. A predetermined number of dedicated lines are assigned from among the maximum number of connections provided by the Wi-Fi connection unit 11 serving as the first communication unit. Consequently, dedicated lines, the number of which is less than the maximum number of connections, are prepared. The number of dedicated lines is typically equal to 1 in the case where the number of NFC I/Fs 111 corresponding to the NFC connection unit 12 is equal to 1. That is, in the case where the maximum number of allowed Wi-Fi Direct connections is equal to 3, one line is prepared as a dedicated line for the connection-requesting terminal apparatus. In addition, two lines are provided for the mobile terminals 20 that perform wireless communication with the Wi-Fi connection unit 11 without using the NFC connection unit 12.

That is, the image-processing-apparatus-side control unit 13 provides a dedicated line for the mobile terminal 20 that attempts, by using the NFC connection unit 12 (i.e., the NFC I/F 111), to establish a connection to the image processing apparatus 10. In the case where the number of allowed connections to the image processing apparatus 10 is equal to three and the number of dedicated lines is set to 1, the number of lines provided for the other mobile terminals 20 is reduced by 1 and becomes equal to 2.

In this case, the image-processing-apparatus-side control unit 13 preferably performs control to allow the connection-requesting terminal apparatus to perform wireless communication with the Wi-Fi connection unit 11 over a period for which the connection-requesting terminal apparatus is able to perform wireless communication with the NFC connection unit 12.

Specifically, a period for which the connection-requesting terminal apparatus is able to perform wireless communication with the NFC connection unit 12 is a period over which the connection-requesting terminal apparatus is placed on or over the NFC connection unit 12 (i.e., the NFC I/F 111). In other words, a period over which the connection-requesting terminal apparatus is preferentially allowed to connect to the image processing apparatus 10 is limited to a period over which the connection-requesting terminal apparatus is placed on (is touching) or over the NFC connection unit 12. The connection between the connection-requesting terminal apparatus and the image processing apparatus 10 is terminated upon the connection-requesting terminal apparatus being removed (detached) from the NFC connection unit 12.

A dedicated line described above is provided. With this configuration, a user who newly attempts, by using the NFC connection unit 12, to connect the mobile terminal 20 to the image processing apparatus 10 is preferentially allowed to use the image processing apparatus 10 by using Wi-Fi Direct.

In addition, a period over which preferential connection to the image processing apparatus 10 is permitted is limited to a period over which the connection-requesting terminal apparatus is placed on or over the NFC connection unit 12. With this configuration, the connection is terminated immediately after the user has finished using the connection-requesting terminal apparatus that is preferentially connected to the image processing apparatus 10. Only one connection-requesting terminal apparatus is physically allowed to be placed on or over the NFC connection unit 12. For this reason, a situation may be suppressed where an attempt to establish a connection fails because the previous connection is not terminated when another connection-requesting terminal apparatus is placed.

Although the number of dedicated lines is set to 1 in the example described above, plural dedicated lines may be provided. In the case where plural dedicated lines are provided, however, the same number of NFC connection units 12 as the number of dedicated lines need to be provided.

When the above-described configuration of the image-processing-apparatus-side control unit 13 is viewed from the mobile terminal 20 side, the configuration may be considered such that the Wi-Fi connection unit 21 performs wireless communication by using a dedicated line, which is provided by the image processing apparatus 10 and to which an apparatus that has performed wireless communication via the NFC connection unit 22 is connected.

Description regarding Operations of Image Processing Apparatus 10 and Mobile Terminal 20

Operations of the image processing apparatus 10 and the mobile terminal 20 will be described.

FIG. 5 is a flowchart describing operations of the image processing apparatus 10 and the mobile terminal 20.

Operations of the image processing apparatus 10 and the mobile terminal 20 will be described below with reference to FIGS. 4 and 5.

When a user wishes to print an image represented by print data stored in the mobile terminal 20 by using the image processing apparatus 10, the user goes to the location where the image processing apparatus 10 is installed and places the mobile terminal 20 (i.e., the connection-requesting terminal apparatus) on the NFC connection unit 12 (i.e., the NFC I/F 111) to cause the connection-requesting terminal apparatus to touch the NFC connection unit 12. In response to this action, NFC wireless communication is automatically initiated between the NFC connection unit 22 (i.e., the NFC I/F 204) of the connection-requesting terminal apparatus and the NFC connection unit 12. Then, information concerning connection conditions that are pre-set by the connection-requesting terminal apparatus and that are used to establish a connection to the Wi-Fi connection unit 11 (i.e., the wireless communication I/F 110) is transmitted and received. Consequently, the NFC connection unit 12 receives the information concerning connection conditions (step S101). At this time, the NFC connection unit 12 of the image processing apparatus 10 operates in a card emulation mode and returns a response upon receipt of a data acquisition request from the NFC connection unit 22 of the connection-requesting terminal apparatus that operates in a reader/writer mode. At this time, the information concerning connection conditions is transmitted and received in accordance with the NFC data exchange format (NDEF), which is a data format generally used in NFC communication.

Then, the image-processing-apparatus-side control unit 13 transmits information necessary for Wi-Fi Direct connection to the connection-requesting terminal apparatus via the NFC connection unit 12 (step S102). This information is, for example, a MAC address or an SSID of the image processing apparatus 10.

The NFC connection unit 22 of the connection-requesting terminal apparatus receives this information. The terminal-apparatus-side control unit 23 then identifies a Wi-Fi Direct connection destination from this information (step S103). Then, the terminal-apparatus-side control unit 23 switches wireless communication from wireless communication via the NFC connection unit 22 to wireless communication via the Wi-Fi connection unit 21 (i.e., the wireless communication I/F 203) (step S104).

Then, the Wi-Fi connection unit 21 transmits a connection request to the Wi-Fi connection unit 11. A connection is established between the Wi-Fi connection unit 21 of the connection-requesting terminal apparatus and the Wi-Fi connection unit 11 of the image processing apparatus 10 by using the connection conditions. As a result, the connection-requesting terminal apparatus and the image processing apparatus 10 are connected to each other based on Wi-Fi Direct (step S105). The Wi-Fi Direct line used at this time is the dedicated line described above to which the connection-requesting terminal apparatus is connected preferentially over other mobile terminals 20 in this case.

The user then operates the connection-requesting terminal apparatus or the image processing apparatus 10 to input an instruction to cause the image processing apparatus 10 to perform printing. As a result, image data is transmitted from the Wi-Fi connection unit 21 to the Wi-Fi connection unit 11 by using Wi-Fi Direct, and printing is performed by the image forming unit 14 of the image processing apparatus 10 (step S106).

After printing has been finished, the user removes or detaches the connection-requesting terminal apparatus from the NFC connection unit 12 (i.e., the NFC I/F 111). As a result, the NFC connection unit 12 and the connection-requesting terminal apparatus are no longer able to perform wireless communication. Thus, the image-processing-apparatus-side control unit 13 terminates the Wi-Fi Direct connection that has been established between the connection-requesting terminal apparatus and the image processing apparatus 10 (step S107). The connection may be terminated when the printing is finished.

In the example described in detail above, wireless communication is performed between the mobile terminal 20 and the image processing apparatus 10 by using Wi-Fi Direct. However, the wireless communication scheme is not limited to this particular scheme, and any wireless communication scheme with a limited number of connections may be used.

In addition, in the example described in detail above, the mobile terminal 20 performs wireless communication by using Wi-Fi Direct. However, the apparatus is not limited to the mobile terminal 20, and the operation terminal 30 (see FIG. 1) may perform wireless communication.

Further, in the example described in detail above, the image processing apparatus 10 that forms an image serves as an information processing apparatus according to the present exemplary embodiment. However, the information processing apparatus is not limited to the image processing apparatus 10 and may be an apparatus of another type.

While the exemplary embodiment has been described above, the technical scope of the present invention is not limited to the scope of the above-described exemplary embodiment. It is obvious from the attached claims that embodiments obtained by making various alterations and improvements to the exemplary embodiment are also within the technical scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a first communication unit configured to perform wireless communication with a plurality of terminal apparatuses, the number of which is less than or equal to a predetermined maximum number of connections;
    a second communication unit configured to perform wireless communication with a connection-requesting terminal apparatus that newly attempts to perform wireless communication with the first communication unit; and
    a communication-apparatus-side controller configured to switch the wireless communication via the second communication unit to wireless communication via the first communication unit based on information concerning connection conditions received via the second communication unit, the wireless communication via the first communication unit being performed using a dedicated line prepared in advance, the dedicated line being predetermined for the terminal apparatuses that attempt to perform wireless connection via a Near Field Communication connection.

2. The information processing apparatus according to claim 1, wherein the communication-apparatus-side controller performs control to allow the connection-requesting terminal apparatus to perform wireless communication with the first communication unit while the connection-requesting terminal apparatus is able to perform wireless communication with the second communication unit.

3. The information processing apparatus according to claim 1, wherein
    the second communication unit is a device that performs near-field communication, and
    as many dedicated lines as the number of communication connections supported by the second communication unit are prepared.

4. The information processing apparatus according to claim 2, wherein
    the second communication unit is a device that performs near-field communication, and
    as many dedicated lines as the number of communication connections supported by the second communication unit are prepared.

5. The information processing apparatus according to claim 1, further comprising
    an image forming unit configured to form an image, wherein
    information that is transmitted and received by the first communication unit via wireless communication includes image information used by the image forming unit to form an image.

6. The information processing apparatus according to claim 2, further comprising
    an image forming unit configured to form an image, wherein
    information that is transmitted and received by the first communication unit via wireless communication includes image information used by the image forming unit to form an image.

7. The information processing apparatus according to claim 3, further comprising
    an image forming unit configured to form an image, wherein
    information that is transmitted and received by the first communication unit via wireless communication includes image information used by the image forming unit to form an image.

8. The information processing apparatus according to claim 4, further comprising
    an image forming unit configured to form an image, wherein
    information that is transmitted and received by the first communication unit via wireless communication includes image information used by the image forming unit to form an image.

9. A system comprising:
    an image processing apparatus configured to form an image; and
    a terminal apparatus configured to transmit to the image processing apparatus image information that is used by the image processing apparatus to form an image, the image processing apparatus including a first communication unit configured to perform wireless communication with a plurality of terminal apparatuses, the number of which is less than or equal to a predetermined maximum number of connections, a second communication unit configured to perform wireless communication with a connection-requesting terminal apparatus that newly attempts to perform wireless communication with the first communication unit, a communication-apparatus-side controller configured to switch the wireless communication via the second communication unit to wireless communication via the first communication unit based on information concerning connection conditions received via the second communication unit, the wireless communication via the first communication unit being performed using a dedicated line prepared in advance, the dedicated line being predetermined for the terminal apparatuses that attempt to perform wireless connection via a Near Field Communication connection, and an image forming unit configured to form the image.

10. An information processing method comprising:

performing, via a second communication unit, wireless communication with a connection-requesting terminal apparatus that newly attempts to perform wireless communication with a first communication unit that performs wireless communication with a plurality of terminal apparatuses, the number of which is less than or equal to a predetermined maximum number of connections; and switching the wireless communication via the second communication unit to wireless communication via the first communication unit based on information concerning connection conditions received via the second communication unit, the wireless communication via the first communication unit being performed using a dedicated line prepared in advance, the dedicated line being predetermined for the terminal apparatuses that attempt to perform wireless connection via a Near Field Communication connection.

11. The information processing apparatus according to claim 1, wherein in response to the new attempt to perform the wireless communication with the first communication unit being received via the second communication unit that is a short range communication device, the communication-apparatus-side controller prioritizes the dedicated line for the wireless communication via the first communication unit.

12. The information processing apparatus according to claim 1, wherein the communication-apparatus-side controller preferentially allows the wireless communication via the first communication unit in response to the new attempt to perform wireless communication with the first communication unit being received via the second communication unit that is a short range communication device.

\* \* \* \* \*